(12) United States Patent
Bakiaraj et al.

(10) Patent No.: US 10,708,082 B1
(45) Date of Patent: Jul. 7, 2020

(54) UNIFIED CONTROL PLANE FOR NESTED CLUSTERS IN A VIRTUALIZED COMPUTING INFRASTRUCTURE

(71) Applicant: Juniper Networks, Inc., Sunnyvale, CA (US)

(72) Inventors: Dinesh Bakiaraj, San Jose, CA (US); Yuvaraja Mariappan, San Jose, CA (US); Sachchidanand Vaidya, Santa Clara, CA (US); Rudramahesh S. Rugge, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 6 days.

(21) Appl. No.: 16/118,731

(22) Filed: Aug. 31, 2018

(51) Int. Cl.
*H04L 12/46* (2006.01)
*H04L 12/715* (2013.01)
*H04L 12/713* (2013.01)
*H04L 12/24* (2006.01)
*G06F 9/455* (2018.01)

(52) U.S. Cl.
CPC ...... *H04L 12/4666* (2013.01); *H04L 41/0806* (2013.01); *H04L 45/586* (2013.01); *H04L 45/64* (2013.01); *G06F 9/455* (2013.01)

(58) Field of Classification Search
CPC ............. H04L 12/4666; H04L 41/0806; H04L 45/586; H04L 45/64; H04L 29/08837; H04L 29/08846; H04L 49/354; H04L 49/70; G06F 9/455; G06F 9/5077; G06F 11/1484; G06F 12/0292
See application file for complete search history.

(56) References Cited

U.S. PATENT DOCUMENTS 8,054,832 B1 * 11/2011 Shukla .................... H04L 45/00
                                                      370/230
8,750,288 B2    6/2014 Nakil et al.
(Continued)

FOREIGN PATENT DOCUMENTS

WO         2013184846 A1    12/2013

OTHER PUBLICATIONS

Siddiqui et al., "Enabling New Features with Kubernetes for NFV", 2017, Intel, White Paper, pp. 1-14, Total pp. 14 (Year: 2017).*
(Continued)

*Primary Examiner* — Un C Cho
*Assistant Examiner* — Shah M Rahman
(74) *Attorney, Agent, or Firm* — Shumaker & Sieffert, P.A.

(57) ABSTRACT

Techniques are disclosed for a unified control plane in a nested cluster environment. In one example, an underlay orchestrator for a virtualized computing infrastructure is configured to provision, in an underlay cluster of one or more servers, an overlay cluster of one or more overlay nodes. Each of the overlay nodes is a workload of one of the servers and has a virtual network interface. Further, each server executes a virtual router and a virtual router agent for the virtual router for routing packets among virtual network interfaces of the overlay nodes executed by the server. A network controller is configured to configure virtual network sub-interfaces for workloads of the overlay nodes to enable communications among workloads executing in different overlay nodes. Each of the sub-interfaces is a virtual network sub-interface of one of the virtual network interfaces.

20 Claims, 5 Drawing Sheets

(56) References Cited

U.S. PATENT DOCUMENTS

| | | | |
|---|---|---|---|
| 9,571,394 | B1 | 2/2017 | Sivaramakrishnan et al. |
| 9,634,948 | B2* | 4/2017 | Brown .................. H04L 47/323 |
| 9,703,589 | B2* | 7/2017 | Zheng .................... H04L 47/56 |
| 9,898,317 | B2* | 2/2018 | Nakil .................... G06F 9/45558 |
| 10,432,537 | B2* | 10/2019 | Zhang ................. G06F 9/45558 |
| 2015/0081861 | A1* | 3/2015 | Koponen ............ H04L 63/0218 709/222 |
| 2016/0103696 | A1* | 4/2016 | Nataraja ............. G06F 9/45558 718/1 |
| 2016/0205518 | A1* | 7/2016 | Patel ....................... H04L 67/16 455/518 |
| 2016/0218947 | A1* | 7/2016 | Hughes .................... H04J 11/00 |
| 2016/0366233 | A1* | 12/2016 | Le ........................... H04L 67/16 |
| 2016/0378518 | A1* | 12/2016 | Antony ............... G06F 9/45533 718/1 |
| 2017/0168864 | A1* | 6/2017 | Ross .................... G06F 9/45558 |
| 2018/0019948 | A1* | 1/2018 | Patwardhan ......... H04L 47/803 |
| 2018/0063193 | A1* | 3/2018 | Chandrashekhar ... H04L 63/062 |
| 2018/0176255 | A1* | 6/2018 | Bansal ..................... H04L 63/20 |
| 2018/0331969 | A1* | 11/2018 | Chen ..................... G06F 9/5083 |
| 2018/0349033 | A1* | 12/2018 | Kapadia ................. H04L 51/12 |
| 2018/0375728 | A1* | 12/2018 | Gangil ................ H04L 41/0803 |
| 2019/0018671 | A1* | 1/2019 | Zhu .................... H04L 67/1008 |
| 2019/0081955 | A1* | 3/2019 | Chugtu ................. H04L 63/105 |
| 2019/0166002 | A1* | 5/2019 | Chen .................. H04L 41/0896 |
| 2019/0179530 | A1* | 6/2019 | Chen ....................... G06F 3/061 |
| 2019/0215281 | A1* | 7/2019 | Vallala .................... H04L 49/25 |
| 2019/0268777 | A1* | 8/2019 | Simon .............. H04N 21/64322 |
| 2019/0273683 | A1* | 9/2019 | Jiang .................. G06F 9/45558 |
| 2019/0286373 | A1* | 9/2019 | Karumbunathan ... G06F 3/0661 |
| 2019/0303345 | A1* | 10/2019 | Zhu ..................... G06F 12/1072 |
| 2019/0361626 | A1* | 11/2019 | East ....................... G06F 3/0664 |

OTHER PUBLICATIONS

"Kubernetes networking with OpenContrail," OpenContrail Blog, http://www.opencontrail.org/kubernetes-networking-with-opencontrail/, Jul. 26, 2015, 6 pp.

Mackie et. al., "BGP-Signaled End-System IP/VPNs," draft-ietf-l3vpn-end-system-06, Network Working Group, Dec. 15, 2016, 32pp.

"PCI-SIG SR-IOV Primer: An Introduction to SR-IOV Technology," Rev. 2.5, Intel Corp., Jan. 2011, 28 pp.

Rosen, "BGP/MPLS IP Virtual Private Networks (VPNs)," Request for Comments 4364, Internet Engineering Task Force Network Working Group, Feb. 2006, 48 pp.

"Multiple Network Interfaces in Kubernetes," Application Note, Intel Corp., Software Defined Datacenter Solutions Group, Apr. 2018, 15pp.

U.S. Appl. No. 16/118,107, entitled "Multiple Virtual Network Interface Support for Virtual Execution Elements," filed Aug. 30, 2018.

* cited by examiner

UNIFIED CONTROL PLANE FOR NESTED CLUSTERS IN A VIRTUALIZED COMPUTING INFRASTRUCTURE

TECHNICAL FIELD

The disclosure relates to a virtualized computing infrastructure and, more specifically, to provisioning clusters within a virtualized computing infrastructure within a network.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtualized computing environments, such as containers or VMs, as well as among applications running on legacy (e.g., physical) environments. Software-defined networking contributes to network management.

SUMMARY

In general, techniques are described for managing, with a unified control plane, network connectivity for clusters in a nested stack of layered clusters provisioned in a virtualized computing environment. In the context of computing environments, a "cluster" includes one or more cluster nodes that execute workloads and a cluster orchestrator that manages the one or more cluster nodes. In some cases, a cluster orchestrator of a first cluster may instantiate an entire second cluster as workloads of cluster nodes of the first cluster. The second cluster may be referred to as an "overlay cluster," while the first cluster may be referred to as an "underlay cluster," and both the first cluster and second clusters are layers of a nested stack of clusters.

Conventionally, a nested cluster may require a separate and independent control and data plane for each cluster layer. Managing these multiple control planes at multiple layers poses an operational challenge to administrators. For example, system and network performance may be reduced because a packet is processed by a separate data plane at each layer of the nested cluster.

In accordance with the techniques of the disclosure, an orchestrator for the overlay cluster instantiates a plurality of workloads, wherein each workload of the plurality of workloads is executed by an overlay node of the overlay cluster. Each overlay node of the overlay cluster is executed as a workload of a respective underlay node of an underlay cluster and has a virtual network interface to communicate using the physical network interface of the underlay node. Each overlay node also includes a data plane agent, in the form of a virtual router agent, for communicating with a network controller for the stacked cluster to obtain network configuration data for the workloads of the overlay cluster. Furthermore, the master overlay node, which is responsible for orchestrating workloads of the overlay cluster, includes a network controller manager that enables the overlay orchestrator to notify the unified network control plane of new workloads of the overlay cluster and cause the unified network plane to generate and configure network configurations for the workloads.

For example, the network controller manager generates, for each overlay node of the overlay cluster, network configuration data for a virtual network interface for communicating via the physical network interface of the host server (an underlay node) for the overlay node. Further, the network controller manager generates, for each workload assigned to an overlay node, network configuration data specifying a unique virtual network sub-interface identifier for exchanging traffic between the workload and the virtual network interface for the overlay node. A virtual router agent executing in the host server obtains virtual router configuration data from the network controller to realize, in the virtual router of the host server, the network configurations specified in the network configuration data for the virtual network interfaces and the sub-interfaces thereof.

Thus, the techniques of the disclosure provide for a collapsed and unified control plane and data plane to manage multiple layers of clusters in a stack. With such a unified control and data plane, the controller may configure each cluster within the stack in a seamless fashion. Furthermore, workloads in each cluster in the stack may communicate with other components in the stack transparently and without exposure. As another example, the unified control and data plane may require less replication and duplication of services across the stack. Thus, such a unified control plane and data plane provide increased system and network performance over conventional nested cluster architectures. Thus, an administrator of a data center may use an underlay cluster with an arbitrary implementation to manage underlying infrastructure. However, customers of the data center may use different overlay clusters with different implementations to manage workloads. The customers may install additional overlay clusters on the underlay cluster and use the overlay clusters to manage workloads without having to provision an independent control and data plane for each overlay cluster. Thus, the techniques of the disclosure may allow for the use of a cluster-on-demand model, where the system may create and destroy overlay clusters on demand with minimal effort and resource costs.

In one example, this disclosure describes a controller comprising one or more computing devices, wherein each of the computing devices comprises processing circuitry coupled to a memory device, wherein the controller further comprises: an underlay orchestrator for a virtualized computing infrastructure, wherein the underlay orchestrator is configured for execution by the processing circuitry, wherein the underlay orchestrator is configured to: provision, in an underlay cluster of one or more servers, an overlay cluster of one or more overlay nodes, wherein each of the overlay nodes is a workload of one of the servers and has a virtual network interface, wherein each server of the servers executes a virtual router and a virtual router agent for the virtual router for routing packets among virtual network interfaces of the overlay nodes executed by the server; a network controller configured to configure virtual network sub-interfaces for workloads of the overlay nodes to enable communications among workloads executing in different overlay nodes, wherein each of the virtual network sub-interfaces is a sub-interface of one of the virtual network interfaces.

In another example, this disclosure describes a method comprising: provisioning, by an underlay orchestrator of a controller for a virtualized computing infrastructure, an overlay cluster of one or more overlay nodes in an underlay cluster of one or more servers, wherein each of the overlay nodes is a workload of one of the servers and has a virtual network interface, wherein the underlay orchestrator is configured for execution by the processing circuitry, and wherein each server of the servers executes a virtual router and a virtual router agent for the virtual router for routing packets among virtual network interfaces of the overlay nodes executed by the server; and configuring, by a network controller of the controller, virtual network sub-interfaces for workloads of the overlay nodes to enable communications among workloads executing in different overlay nodes, wherein each of the virtual network sub-interfaces is a sub-interface of one of the virtual network interfaces.

In another example, this disclosure describes a system comprising: a first computing device comprising processing circuitry coupled to a memory device, wherein the first computing device executes one or more overlay minion nodes of an overlay cluster, wherein each of the overlay minion nodes has a virtual network interface and executes workloads, wherein the first computing device further executes a virtual router and a virtual router agent for the virtual router for routing packets among virtual network interfaces of the overlay minion nodes executed by the server; and a second computing device comprising processing circuitry coupled to a memory device, wherein the second computing device is configured to execute an overlay orchestrator configured to orchestrate the workloads executed by the overlay minion nodes of the overlay cluster, wherein the second computing device is further configured to execute a network controller manager configured to cause a network controller to configure virtual network sub-interfaces for the workloads executed by the overlay minion nodes of the overlay cluster, and wherein the virtual router agent is configured to receive, from the controller, network configuration data for the virtual network sub-interfaces for the workloads, wherein the first computing device is further configured to execute a network module configured to: obtain the network configuration data from the virtual router agent; and based on the network configuration data, configure virtual network sub-interfaces for the workloads of the overlay nodes to enable communications among workloads executing in different overlay nodes, wherein each of the virtual network sub-interfaces is a sub-interface of one of the virtual network interfaces.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
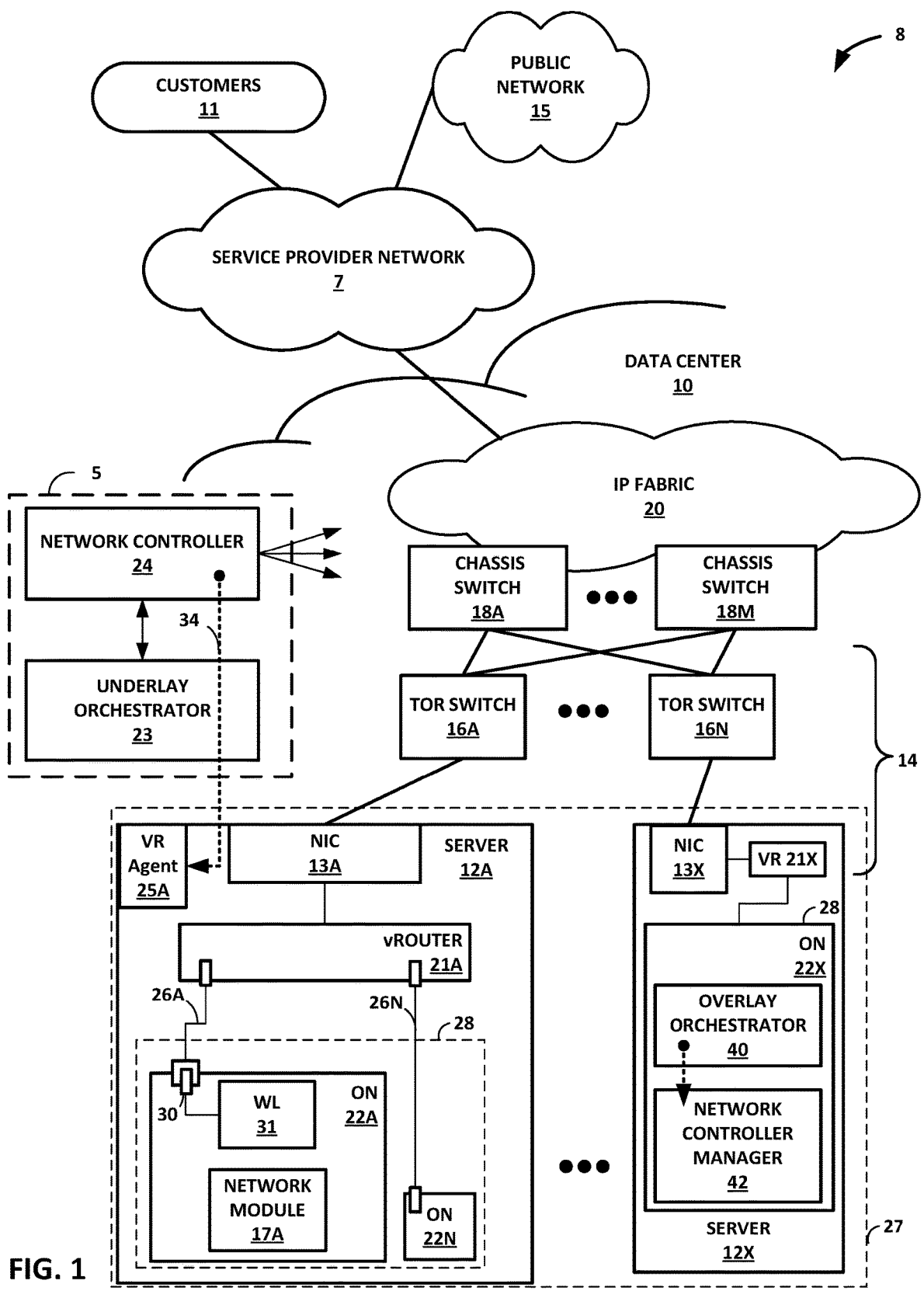
FIG. 1 is a block diagram illustrating an example network having a data center in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11. Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

For example, with respect to FIG. 1, servers 12 execute underlay cluster 27, with each server 12 executing a respective underlay node of underlay cluster 27. In some examples, underlay cluster 27 is an OpenStack cluster. As described in detail below, each underlay node executes overlay cluster 28 comprising one or more overlay nodes 22A-22N (collectively, "overlay nodes 22") as workloads of the underlay node. With respect to the OpenStack example above, an underlay node may execute overlay cluster 28 by executing each overlay node 22 of overlay cluster 28 as a respective OpenStack workload of the underlay node. In some examples, network controller 24 and underlay orchestrator 23 may address each underlay node via a physical interface of NIC 13A.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across, physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state, such as any Media Access Control (MAC) addresses, IP address, or policies for virtual machines or other virtual execution elements. The forwarding tables of the underlay physical routers and switches may only contain the IP prefixes or MAC addresses of the physical servers 12. (Gateway routers or switches that connect a virtual network to a physical network are an exception and may contain tenant MAC or IP addresses).

Virtual routers 21 of servers 12 do contain per tenant state. They contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails. In the example of FIG. 1, each of overlay nodes 22 may execute within a container.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), an overlay cluster (e.g., one of overlay nodes 22), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one or more overlay nodes 22A-22N (collectively, "overlay nodes 22") that each represent a virtual execution element in the overlay cluster 28. Overlay cluster 28 also includes overlay node 22X executing on server 12X. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., overlay node 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Network system 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of network systems 8 include at least servers 12, underlay orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Underlay orchestrator 23 and network controller 24 together implement a controller 5 for the computing infrastructure 8. Underlay orchestrator 23 and network controller 24 may execute on separate computing devices, execute on the same computing device. Each of underlay orchestrator 23 and network controller 24 may be a distributed application that executes on one or more computing devices. Underlay orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from underlay orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, underlay orchestrator 23 controls the deployment, scaling, and operations of virtual execution elements across underlay cluster 27 of servers 12 and providing computing infrastructure, which may include container-centric computing infrastructure. Underlay orchestrator 23 and, in some cases, network controller 24 may implement respective cluster orchestrators for one or more Openstack clusters. In other examples, underlay orchestrator 23 and, in some cases, network controller 24 may implement respective cluster masters for one or more Kubernetes clusters. Kubernetes is a container management platform that provides portability across public and private clouds, each of which may provide virtualization infrastructure to the container management platform.

In one example, overlay node 22A may be a virtual machine, which may be an Openstack workload, and which is an example of a virtual network endpoint. Overlay nodes 22 make up overlay cluster 28 and execute workloads for the overlay cluster 28. For example, overlay node 22A executes workload 31. A workload may be a virtual execution element, such as a container, a pod, or virtual machine. A pod is a group of one or more logically-related containers (not shown in FIG. 1), the shared storage for the containers, and options on how to run the containers. Where instantiated for execution, a pod may alternatively be referred to as a "pod replica." Each container of overlay node 22A is an example of a virtual execution element. Containers of a pod are co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Overlay orchestrator 40 may implement a master node for overlay cluster 28 having one or more minion nodes implemented by respective servers 12. In general, overlay orchestrator 40 controls the deployment, scaling, and operations of virtual execution elements across overlay cluster 28 and provides computing infrastructure, which may include container-centric computing infrastructure. Overlay orchestrator 40 may implement respective cluster masters for one or more Kubernetes clusters. Kubernetes is a container management platform that provides portability across public and private clouds, each of which may provide virtualization infrastructure to the container management platform.

Network controller manager 42 monitors overlay cluster 28 for new objects (e.g., pods and services). Network controller manager 42 may isolate pods in virtual networks and connect pods with services. Network controller manager 325 may be executed as a container of overlay master node 22X for overlay cluster 28. In some cases, network controller manager 42 enables disabling the service proxies of overlay minion nodes (e.g., the Kubernetes kube-proxy) such that all pod connectivity is implemented using virtual routers 21, as described herein.

Network controller manager 42 may use the controller framework for overlay orchestration platform 40 to listen for (or otherwise monitor for) changes in objects that are defined in the API and to add annotations to some of these objects. The annotations may be labels or other identifiers specifying properties of the objects (e.g., "Virtual Network Green"). Network controller manager 42 may create a network solution for the application using an interface to network controller 24 to define network objects such as virtual networks, virtual network interfaces, and access control policies. Network controller 24 may implement the network solution in the computing infrastructure by, e.g., configuring the virtual network and virtual network interfaces 26 and virtual network sub-interface 30 in virtual routers 21 based on configuration data obtained from network controller manager 42.

In accordance with the techniques of the disclosure, server 12A further includes network module 17A. As part of the process of creating workload 31, overlay orchestrator 40 requests that network controller manager 42 create a virtual network sub-interface 30 for an overlay virtual network that includes the workload 31. Network controller manager 42 interfaces with network controller 24 to create the configuration objects for the virtual network sub-interface 30. Network controller 24 processes the configuration objects to generate interface configuration data 34 for the virtual network sub-interface 30 for workload 31. Interface configuration data 34 may include a container or pod or workload unique identifier and a list or other data structure specifying, for virtual network sub-interface 30, network configuration data for configuring the virtual network sub-interface. Network configuration data for a virtual network interface may include a network name, assigned virtual network address, MAC address, virtual local area network (VLAN) identifier, and/or domain name server values. Network controller 24 sends interface configuration data 34 to server 12A and, more specifically in some cases, to virtual router agent 25A. To configure virtual network sub-interface for workload 31, network module 17A obtains and processes the interface configuration data 34. The network module 17A may configure virtual network interface 26A. For example, network module 17A may attach one end of a veth pair implementing virtual network interface 26A to virtual router 21A and may attach the other end of the same veth pair to ON 22A.

Network module 17A may obtain configuration data from vrouter agent 25A and use the configuration data to configure virtual network interface 26A for overlay node 22A with a unique virtual network sub-interface 30 for workload 31 configured to execute on overlay node 22A. The unique virtual network sub-interface 30 enables the workload to communicate with other workloads executing on overlay cluster 28 or with workloads executing on different overlay clusters 28 in different underlay nodes (e.g., on different servers 12) of underlay cluster 27. Network module 17A may configure the virtual network interface 26A with the virtual network sub-interface 30, which may be a MACVLAN in some examples. Network module 17A may further communicate data plane requirements of overlay node 22A to vrouter 21A to enable vrouter 21A to direct traffic to and from workloads executed by overlay node 22A.

Thus, the techniques of the disclosure provide for a collapsed and unified control plane and data plane to manage multiple layers of clusters in a stack. With such a unified control and data plane, network controller 24 may configure underlay clusters and overlay clusters within a network stack in a seamless fashion. Furthermore, workloads executed by overlay clusters in the stack may communicate with other components in other layers of the stack transparently and without exposure. As another example, the unified control and data plane may require less replication and duplication of services across the stack. Thus, such a unified control plane and data plane provide increased system and network performance over conventional nested cluster architectures. Thus, an administrator of data center 10 may use underlay cluster 27 with an arbitrary implementation to manage underlying infrastructure. Further, customers of data center 10 may use different overlay clusters (e.g., overlay cluster 28) with different implementations to manage their workloads. The customers may install additional overlay clusters 28 on underlay cluster 27 and use overlay clusters 28 to manage workloads without having to provision an independent control and data plane for each overlay cluster 28. Thus, the techniques of the disclosure may allow for the use of a cluster-on-demand model, where the system may create and destroy overlay clusters on demand with minimal effort and resource costs.

Figure 2:
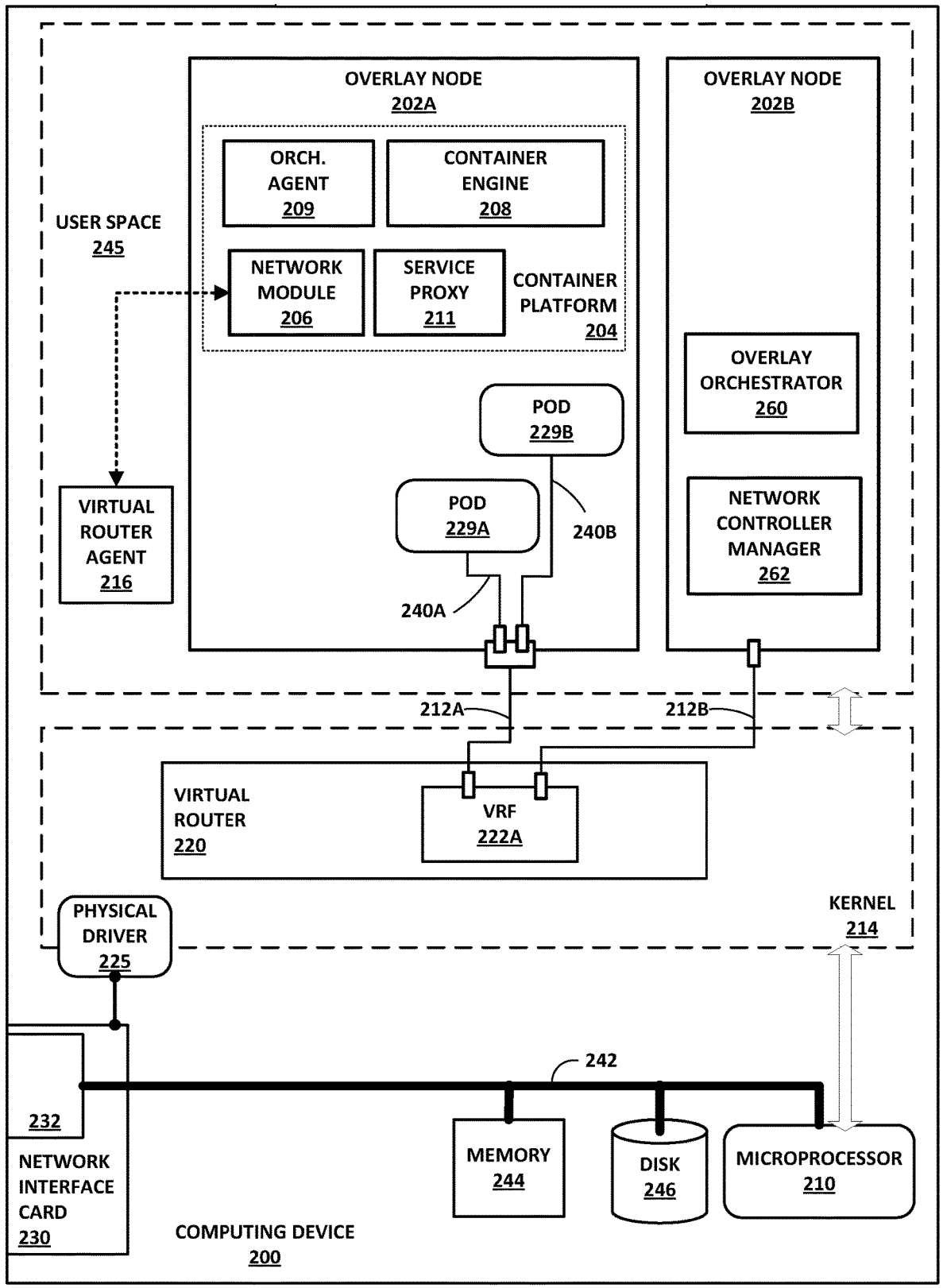
FIG. 2 is a block diagram of an example computing device for managing network connectivity for clusters in a nested stack of layered clusters provisioned in a virtualized computing environment in accordance with the techniques described in this disclosure.

FIG. 2 is a block diagram of example computing device 200 for managing network connectivity for clusters in a nested stack of layered clusters provisioned in a virtualized computing environment in accordance with the techniques described in this disclosure. Computing device 200 of FIG. 2 may represent a real or virtual server and may represent an example instance of any of servers 12 of FIG. 1. In some examples, computing device 200 may exist on a single device or may be distributed across multiple devices. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (WM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as workloads 229A-229B executed by containers or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within kernel 214, but virtual router 220 may execute within a hypervisor, a host operating system, a host application, or a virtual machine in various implementations.

Virtual router 220 may replace and subsume the virtual routing/bridging functionality of the Linux bridge/OVS module that is commonly used for Kubernetes deployments of overlay nodes 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 220 may represent a PE router and virtual execution endpoints may be examples of CE devices described in RFC 4364.

In the example of FIG. 2, computing device 200 executes a nested cluster architecture. For example, computing device 200 may execute an underlay node of underlay cluster 27 of FIG. 1. Further, computing device 200 may execute overlay nodes 202 as workloads of the underlay node. In general, each of overlay nodes 202A-202B may be assigned one or more virtual network addresses for use within respective virtual networks, where each of the virtual networks may be associated with a different virtual subnet provided by virtual router 220. Overlay node 202B may be assigned its own virtual layer three (L3) IP address, for example, for sending and receiving communications but may be unaware of an IP address of the computing device 200 on which the overlay node 202B executes. The virtual network address may thus differ from the logical address for the underlying, physical computer system, e.g., computing device 200. In some examples, the virtual network address is a unique virtual network interface identifier assigned to a virtual network interface of an underlay node workload that executes overlay node 202B.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to control create virtual networks and configure network virtualization endpoints, such as computing device 200 and, more specifically, virtual router 220, as a well as virtual network interfaces 212, 213.

In one example, network packets, e.g., layer three (L3) IP packets or layer two (L2) Ethernet packets generated or consumed by containers executing workloads 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of overlay nodes 202, and virtual router 220 exchanges packets with overlay nodes 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212A. VRF 222A forwards the inner packet via virtual network interface 212A to overlay node 202A in response.

Containers executing workloads 229A-229B 229A-229B may also source inner packets as source virtual network endpoints. A container executing workload 229A, for instance, may generate a layer 3 inner packet destined for a destination virtual network endpoint that is executed by another computing device (i.e., not computing device 200) or for another one of containers executing workloads 229A-229B. A container executing workload 229A sends the layer 3 inner packet to virtual router 220 via virtual network interface 212A attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of overlay nodes 202 to cause the virtual machines 224 to use virtual router 220 as an initial next hop for outbound packets. In some examples, NIC 230 is configured with one or more forwarding rules to cause all packets received from virtual machines 224 to be switched to virtual router 220.

Overlay nodes 202A-202B may represent example instances of overlay node 22A of FIG. 1, in further detail. Overlay node 202A includes one or more containers executing workloads 229A, and overlay node 202B includes one or more containers executing workloads 229B. Each of workloads 229A-229B may be a virtual network service provided to a customer of data center 10A, such as a firewall service, packet filtering service, etc.

Container platform 204 includes orchestration agent 209, container engine 208, network module 206, and service proxy 211. Network module 206 may represent an example instance of network module 17A of FIG. 1.

Container engine 208 includes code executable by microprocessor 210. Container runtime 208 may be one or more computer processes. Container engine 208 runs containerized applications in the form of containers executing workloads 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from orchestration agent 209, container engine 208 may obtain images and instantiate them as executable containers executing workloads 229A-229B in overlay nodes 202A-202B.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and overlay nodes 202 by network modules 206.

Overlay cluster orchestrator 238 controls the deployment, scaling, and operations of virtual execution elements across underlay cluster 28 and provides computing infrastructure, which may include container-centric computing infrastructure. Overlay cluster orchestrator 238 may implement respective may implement a respective cluster master for a Kubernetes cluster.

Conventionally, a nested cluster may require a separate and independent control and data plane for each cluster layer (e.g., a control and data plane for underlay cluster 27 and a separate control and data plane for overlay cluster 28). Managing these multiple control planes at multiple layers poses an operational challenge to administrators. For example, in a conventional system, network traffic between a first application workload executed by a first container of a first overlay cluster node and a second application workload executed by a second container of a second overlay cluster node may be routed through a control and data plane for a first overlay cluster that includes the first overlay cluster node, through a control and data plane for an underlay cluster, and to a control and data plane for a second overlay cluster that includes the second overlay cluster node. Such a system may have degraded network performance because of the duplicative routing operations that occur as the network traffic is processed by each separate data plane at each layer of the nested cluster. Further, configuring and upgrading each separate control plane and data plane at each layer of the nested cluster may be time-consuming, inefficient, and subject to error.

Orchestration agent 209 is an agent of an orchestrator, e.g., overlay orchestrator 40, that receives container specification data for containers and ensures the containers execute by computing device 200. Container specification data may be in the form of a manifest file sent to orchestration agent 209 from network controller 24 or indirectly received via a command line interface, HTTP endpoint, or HTTP server. Container specification data may be a pod specification (e.g., a PodSpec—a YAML (Yet Another Markup Language) or JSON object that describes a pod) for one of overlay nodes 202 of containers executing workloads 229. Based on the container specification data, orchestration agent 209 directs container engine 208 to obtain and instantiate the container images for the containers executing pods 229, for execution of the containers by computing device 200. In some examples, orchestration agent 209 is a kubelet of a Kubernetes cluster.

In accordance with the techniques of the disclosure, overlay node 202B includes network controller manager 262. Network controller manager 262 is a light-weight agent that runs in overlay master node 202B. Network controller manager 2626 includes code executable by microprocessor 210. Network controller manager 262 acts as a conduit between overlay orchestrator 260 and network controller 24. Network controller manager 262 may receive, from overlay cluster orchestrator 260, events of interest, such as a workload Create, Read, Update, or Delete (CRUD) request, a networking request, or a policy request. Network controller manager 262 converts such events of interest into semantics understood by controller 5 and uploads them to controller 5. Further, network controller manager 262 receives, from controller 5, updates to networking information, converts such updates into semantics understood by overlay orchestrator 260, and sends the updates to overlay orchestrator 260. In some examples, network controller manager 262 may implement the network solution in the computing infrastructure by, e.g., configuring the virtual network and virtual network interfaces 26, 30 in virtual routers 21 based on configuration data obtained from network controller manager 42. In some examples, network controller manager 262 is a modified kube-manager for a Kubernetes cluster.

In one example, network controller manager 262 obtains configuration information from controller 5 and configures virtual network interfaces 212A, 212B overlay nodes 202A, 202B with unique virtual interface identifiers such that virtual router 220 may direct traffic to each overlay node 202 via a respective virtual interface identifier. For example, the unique virtual interface identifier may be a unique L3 IP address, for example, for sending and receiving communications to the overlay node 202. In some examples, the virtual network address is a unique virtual network interface identifier assigned to, e.g., virtual network interface 212A.

Furthermore, overlay node 202A includes network module 206. Network module 206 is a light-weight agent that runs in each overlay minion node 202. Network module 206 includes code executable by microprocessor 210. Network module 206 may be one or more computer processes. Network module 206 may obtain configuration data from vrouter 220 and use the configuration data to configure virtual network interface 212A for overlay node 202A with unique virtual network sub-interfaces 240A, 240B for pods 229A, 229B, respectively. The unique virtual network sub-interfaces 240A, 240B enables pods 229A, 229B to communicate with other pods executing on overlay cluster 28 or with workloads executing on different overlay clusters 28 in different underlay nodes (e.g., on different servers 12) of underlay cluster 27. In some examples, network module 206 represents a network plugin or Application Program Interface (API) to configure the virtual network sub-interfaces 240A, 240B for overlay node 202A with unique virtual network sub-interface identifiers for pods 229. In some examples, the sub-interface identifier is a Media Access Control (MAC) identifier for a MACVLAN. Network module 206 may further communicate data plane requirements of overlay node 202A to vrouter 220 to enable virtual router agent 216 to direct traffic to and from pods 229. In some examples, network module 206 is a CNI agent for a Kubernetes cluster.

Virtual router 220 tags data to and from each pod 229 with the allocated unique sub-interface identifier. For example, virtual router 220 attaches a header specifying the allocated ID to network traffic originating from pod 229A. Further, virtual router 220 may receive network traffic including a header specifying the allocated ID, remove the header, and use the allocated ID to forward the network traffic to pod 229A.

Thus, the techniques of the disclosure provide for a collapsed and unified control plane and data plane to manage multiple layers of clusters in a stack. With such a unified control and data plane, network controller 24 may configure underlay clusters and overlay clusters within a network stack in a seamless fashion. Furthermore, workloads executed by overlay clusters in the stack may communicate with other components in other layers of the stack transparently and without exposure. As another example, the unified control and data plane may require less replication and duplication of services across the stack. Thus, such a unified control plane and data plane provide increased system and network performance over conventional nested cluster architectures. Thus, an administrator of data center 10 may use underlay cluster 27 with an arbitrary implementation to manage underlying infrastructure. Further, customers of data center 10 may use different overlay clusters (e.g., overlay cluster 28) with different implementations to manage their workloads. The customers may install additional overlay clusters 28 on underlay cluster 27 and use overlay clusters 28 to manage workloads without having to provision an independent control and data plane for each overlay cluster 28. Thus, the techniques of the disclosure may allow for the use of a cluster-on-demand model, where the system may create and destroy overlay clusters on demand with minimal effort and resource costs.

Figure 3:
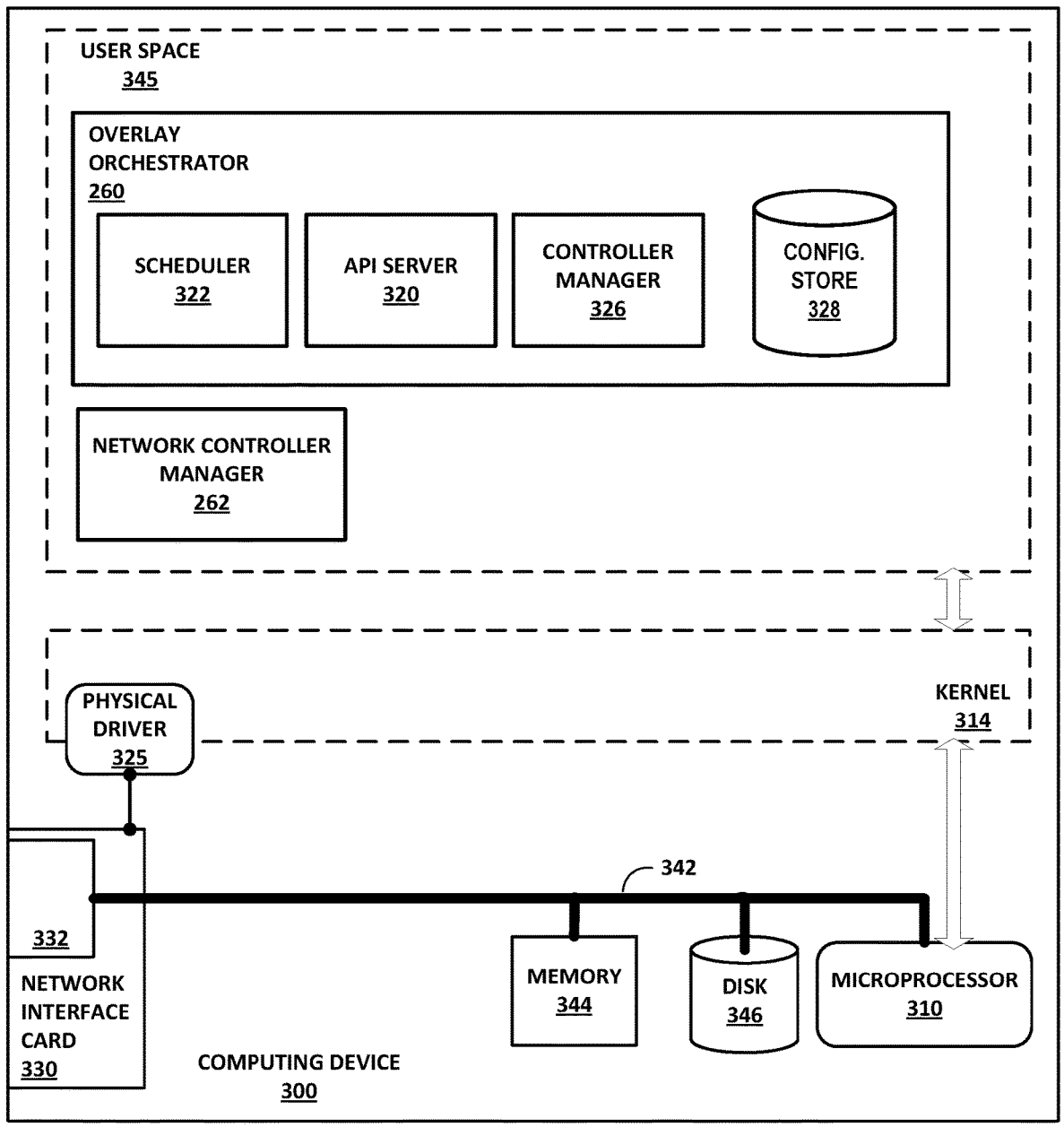
FIG. 3 is a block diagram of an example computing device that includes an overlay orchestrator, according to techniques described in this disclosure.

FIG. 3 is a block diagram of example computing device 300 that includes overlay orchestrator 260, according to techniques described in this disclosure. Computing device 300 of FIG. 3 may represent a real or virtual server and may represent an example instance of any of servers 12 of FIG. 1. In some examples, computing device 300 may exist on a single device or may be distributed across multiple devices. Computing device 300 of FIG. 3 may be configured to perform operations for overlay orchestrator 260. As such, computing device 300 may in some instances implement one or more master nodes for respective overlay clusters 28 of FIG. 1.

Scheduler 322, API server 320, controller manager 326, network controller manager 262, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, controller manager 326, network controller manager 262, or configuration store 328. Network controller manager 262 may represent an example instance of network controller manager 42 of FIG. 1. Scheduler 322, API server 320, controller manager 326, and configuration store 328 may implement an example instance of overlay orchestrator 260.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (WM). An operating system that includes kernel 314 provides an execution environment for one or more processes in user space 345. Kernel 314 includes a physical driver 325 to use the network interface card 330.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

API server 320, scheduler 322, controller manager 326, and configuration store 328 may implement master overlay node 22X for overlay cluster 28 of FIG. 1 and be alternatively referred to as "master overlay components." The overlay cluster may a Kubernetes cluster and the master overlay node a Kubernetes master node, in which case the master overlay components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all overlay cluster data. Overlay cluster data may include overlay cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by microprocessor 310. Scheduler 322 may be one or more computer processes. Scheduler 322 monitors for newly created or requested virtual execution elements (e.g., pods of containers) and selects an overlay minion node on which the virtual execution elements are to run. Scheduler 322 may select an overlay minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select an overlay minion node and returns an identifier for the selected overlay minion node to API server 320, which may write the identifier to the configuration store 328 in association with the virtual execution element. API server 320 may invoke the orchestration agent 209 for the selected overlay minion node, which may cause the container engine 208 for the selected overlay minion node to obtain the virtual execution element from a storage server and create the virtual execution element on the overlay minion node. The orchestration agent 209 for the selected overlay minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the overlay cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller manager 262 includes code executable by microprocessor 310. Network controller manager 262 may be one or more computer processes. Network controller manager 262 operates as an interface between the orchestration-oriented elements (e.g., scheduler 322, API server 320, controller manager 326, and configuration store 328) and controller 5 of FIG. 1. In general, network controller manager 262 monitors overlay cluster 28 for new objects (e.g., pods and services). Network controller manager 262 may isolate pods in virtual networks and connect pods with services.

Network controller manager 262 may be executed as a container of the master overlay node for overlay cluster 28. In some cases, using network controller manager 262 enables disabling the service proxies of overlay minion nodes (e.g., the Kubernetes kube-proxy) such that all pod connectivity is implemented using virtual routers, as described herein.

Network controller manager 262 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 262 may create a network solution for the application to define network objects such as virtual networks, virtual network interfaces, and access control policies. Network controller manager 262 may implement the network solution in computing infrastructure 8 by, e.g., configuring the one or more virtual network and virtual network interfaces in the virtual routers.

Figure 4:
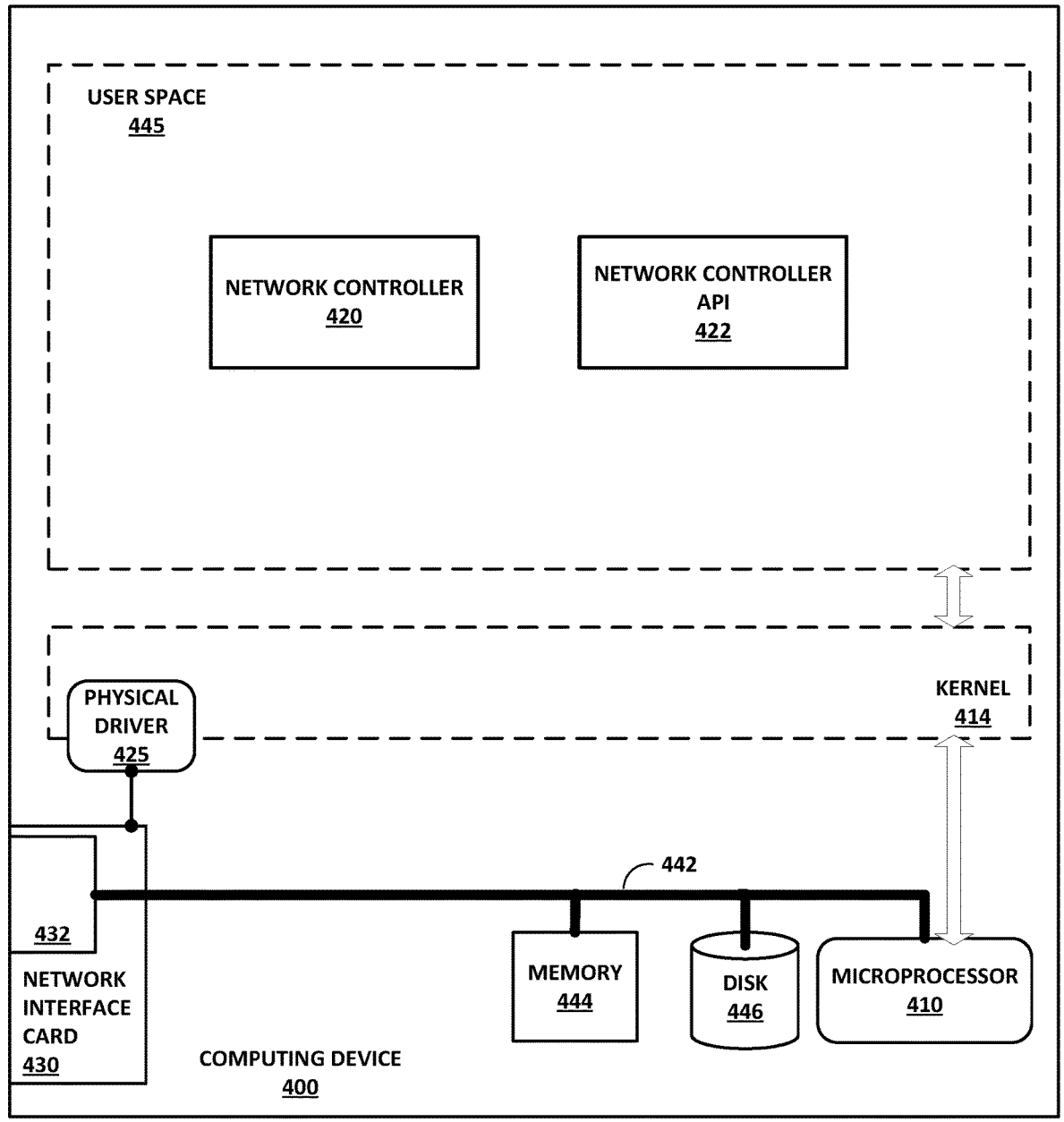
FIG. 4 is a block diagram of an example computing device that includes a network controller and a network controller API, according to techniques described in this disclosure.

FIG. 4 is a block diagram of example computing device 400 that includes network controller 420 and network controller API 422, according to techniques described in this disclosure. Computing device 400 of FIG. 4 may represent a real or virtual server and may represent an example instance of any of servers 12 of FIG. 1. In some examples, computing device 400 may exist on a single device or may be distributed across multiple devices.

Network controller 420 and network controller API 422, although illustrated and described as being executed by a single computing device 400, may be distributed among multiple computing devices 400 that make up a computing system or hardware/server cluster. Each of the multiple computing devices 400, in other words, may provide a hardware operating environment for one or more instances of any one or more of network controller 420 and network controller API 422. Network controller 420 may represent an example instance of network controller 24 of FIG. 1.

Computing device 400 includes in this example, a bus 442 coupling hardware components of a computing device 400 hardware environment. Bus 442 couples network interface card (NIC) 430, storage disk 446, and one or more microprocessors 410 (hereinafter, "microprocessor 410"). A front-side bus may in some cases couple microprocessor 410 and memory device 444. In some examples, bus 442 may couple memory device 444, microprocessor 410, and NIC 430. Bus 442 may represent a Peripheral Component Interface (PCI) express (PCIe) bus. In some examples, a direct memory access (DMA) controller may control DMA transfers among components coupled to bus 442. In some examples, components coupled to bus 442 control DMA transfers among components coupled to bus 442.

Microprocessor 410 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 446 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 410.

Main memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 430 includes one or more interfaces 432 configured to exchange packets using links of an underlying physical network. Interfaces 432 may include a port interface card having one or more network ports. NIC 430 may also include an on-card memory to, e.g., store packet data. Direct memory access transfers between the NIC 430 and other devices coupled to bus 442 may read/write from/to the NIC memory.

Memory 444, NIC 430, storage disk 446, and microprocessor 310 may provide an operating environment for a software stack that includes an operating system kernel 414 executing in kernel space. Kernel 414 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 445. Kernel 414 includes a physical driver 425 to use the network interface card 430.

Computing device 400 may be coupled to a physical network switch fabric that includes an overlay network that extends switch fabric from physical switches to software or "virtual" routers of physical servers coupled to the switch fabric, such virtual router 420 of FIG. 2. Computing device 400 may use one or more dedicated virtual networks to configure minion nodes of a cluster.

Network controller 420 programs network infrastructure elements to create virtual networks and may create interface configurations for virtual network interfaces for the virtual networks. Network controller API 422 acts as an interface to network controller 420. Additional information regarding the operation of network controller 24 and network controller API 422 may be found in U.S. patent application Ser. No. 13/843,500 to Nakil et al., entitled "PHYSICAL PATH DETERMINATION FOR VIRTUAL NETWORK PACKET FLOWS," and filed on Jun. 6, 2013, the entire content of which is incorporated by reference herein.

Figure 5:
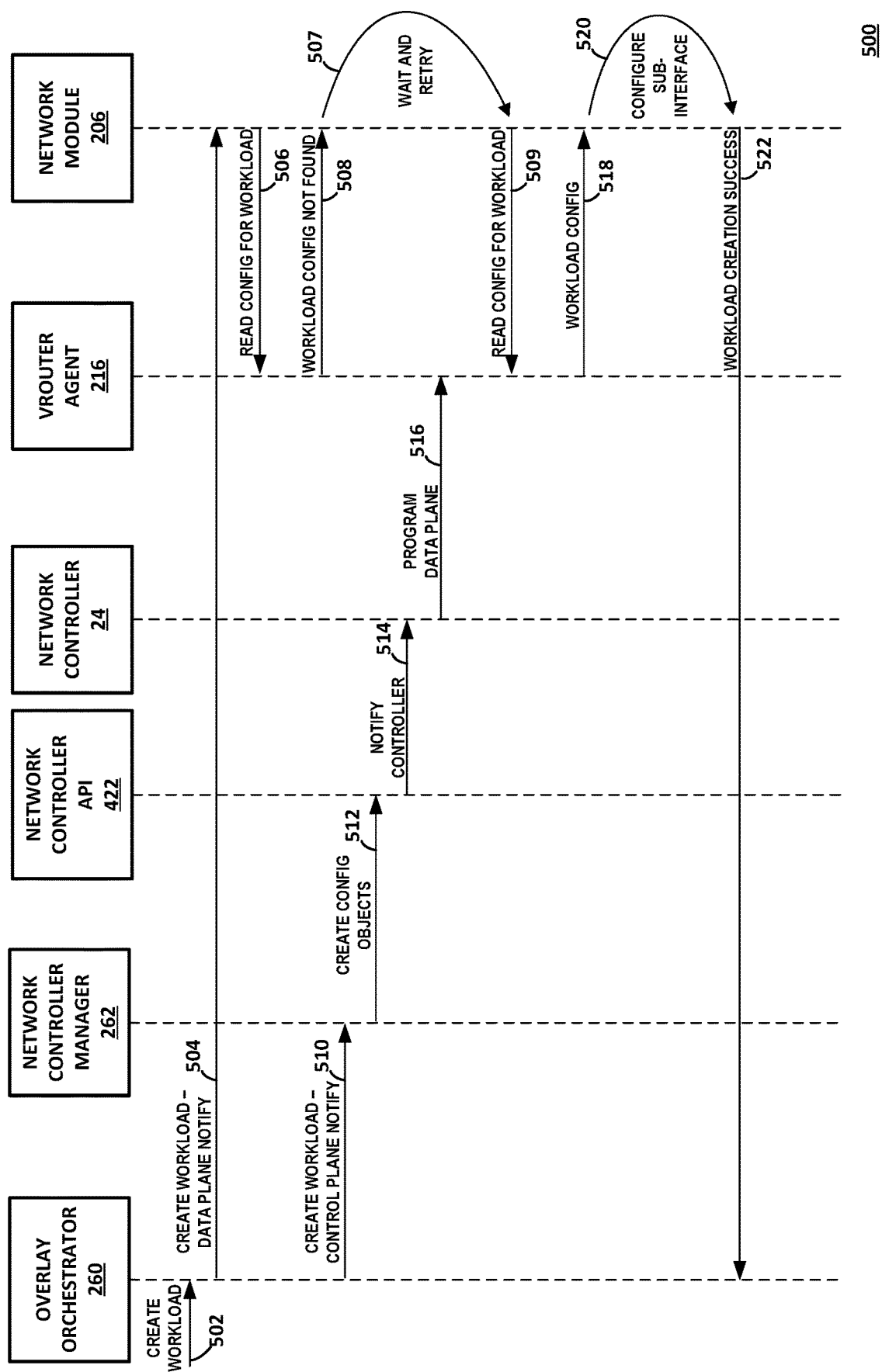
FIG. 5 is a flowchart illustrating an example operation in accordance with the techniques of the disclosure.

FIG. 5 is a flowchart illustrating an example operation in accordance with the techniques of the disclosure. The operations are described with respect to components of computing device 200 of FIGS. 2 and 4.

Overlay orchestrator 260 receives a request to instantiate a new workflow 229 for execution (alternatively, a container or pod) (502). Overlay orchestrator 260 selects overlay node 202A as the host minion for the new workflow 229 and creates a container for executing the new workflow 229 (e.g., pod 229A). Overlay orchestrator 260 issues a notification of the creation of the new workflow 229 to network controller manager 262 (504). Overlay orchestrator 260 further issues a notification of the creation of the new workflow 229 to network controller manager 262 (510).

Network module 206 listens for new objects from overlay orchestrator 260 and determines that the new workflow 229 is to be instantiated on overlay node 202A. Network module 206 further determines that the new workflow 229 requires a virtual network interface. The listening may be in response to subscribing to notifications on a RESTful interface, for example. Network module 206 issues a request to VR agent 216 of Vrouter 220 to read configuration data for the workflow 229 (506). In the example of FIG. 5, workflow 229 has not yet been configured, so VR agent 216 returns a message indicating that the workflow configuration was not found (508). In response to receiving the message indicating that the workflow configuration was not found, network module 206 waits for a predetermined period of time before attempting to retry the request (507).

Network controller manager 262 listens for new objects from overlay orchestrator 260 and determines that the new workflow 229 is to be instantiated on overlay node 202A. Network controller manager 262 creates new configuration objects for the new workflow 229 via network controller API 422 (512). For example, network controller manager 262 creates a virtual network for the new workflow 229 in vrouter 220 and creates a virtual network interface for the new workflow 229 in vrouter 220. Network controller API 422 notifies network controller 24 of the creation of the virtual network for the new workflow 229 (514). Network controller 24 communicates the configuration of the virtual network for the new workflow to VR agent 216, which programs a data plane of vrouter 216 with the configuration.

Network module 206 issues a request to VR agent 216 of Vrouter 220 to read configuration data for the workflow 229 (509). In response, VR agent 216 provides the configuration information for the new workflow 229. In response, to receiving the configuration information, network module 206 configures overlay node 202A with a unique sub-interface identifier for the new workload 229 (520). In some examples, the sub-interface identifier is a Media Access Control (MAC) identifier of a Virtual Local Area Network (VLAN) executed by overlay node 202A. Vrouter 220 may use the sub-interface identifier to uniquely address a pod 229 executed by overlay node 202A. In some examples, network module 206 invokes a network plugin or Application Program Interface (API) to configure the virtual network interface for overlay node 202A with the unique virtual network sub-interface for the workload 229. Network module 206 issues a notification of the successful configuration to overlay orchestrator 238 (522).

As such, the techniques of the disclosure provide for a collapsed and unified control plane and data plane to manage multiple layers of clusters 27, 28 in a nested stack architecture. With such a unified control and data plane, network controller 24 may configure underlay cluster 27 and overlay clusters 28 within a network stack in a seamless fashion. Furthermore, workloads 229 executed by overlay nodes 202 in the stack may communicate with other components in other layers of the stack transparently and without exposure. As another example, the unified control and data plane may require less replication and duplication of services across the stack. Thus, such a unified control plane and data plane provide increased system and network performance over conventional nested cluster architectures. Thus, an administrator of data center 10 may use underlay cluster 27 with an arbitrary implementation to manage underlying infrastructure. Further, customers of data center 10 may use different overlay clusters (e.g., overlay cluster 28) with different implementations to manage their workloads 229. The customers may install additional overlay clusters 28 on underlay cluster 27 and use overlay clusters 28 to manage workloads 229 without having to provision an independent control and data plane for each overlay cluster 28. Thus, the techniques of the disclosure may allow for the use of a cluster-on-demand model, where the system may create and destroy overlay clusters on demand with minimal effort and resource costs.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A controller comprising one or more computing devices, wherein each of the one or more computing devices comprises processing circuitry coupled to a memory device, wherein the controller further comprises:
an underlay orchestrator for a virtualized computing infrastructure, wherein the underlay orchestrator is configured for execution by the processing circuitry, and wherein the underlay orchestrator is configured to:
provision, in an underlay cluster of one or more servers, an overlay cluster of one or more overlay nodes, wherein each of the one or more overlay nodes is a workload of one of the one or more servers and has a virtual network interface,
wherein each server of the one or more servers executes a virtual router and a virtual router agent for the virtual router for routing packets among virtual network interfaces of the overlay nodes executed by the server; and
a network controller configured to:
receive, from a network controller manager of a master overlay node that orchestrates workloads of the one or more overlay nodes, a request to create virtual network sub-interfaces for workloads of the one or more overlay nodes; and
configure, in response to receiving the request from the network controller manager, virtual network sub-interfaces for the workloads of the one or more overlay nodes to enable communications among workloads executing in different overlay nodes, wherein each of the virtual network sub-interfaces is a sub-interface of one of the virtual network interfaces.

2. The controller of claim 1, wherein, to configure the sub-interfaces, the network controller is further configured to configure the virtual network interfaces with unique virtual network sub-interface identifiers for the virtual network sub-interfaces.

3. The controller of claim 2, wherein each of the unique sub-interface identifiers for the virtual network sub-interfaces comprises a unique Media Access Control (MAC)-based Virtual Local Area Network (VLAN) identifier for a VLAN of the one or more overlay nodes.

4. The controller of claim 1, wherein each of the virtual routers is configured to:
receive network traffic associated with the workloads, wherein the network traffic includes a virtual network interface identifier and a virtual network sub-interface identifier; and
forward, based on the virtual network interface identifier and the virtual network sub-interface, identifier, the network traffic to a workload of the one or more overlay nodes.

5. The controller of claim 4, wherein each virtual router is further configured to remove a first header of the network traffic that includes the virtual network interface identifier prior to forwarding the network traffic to a virtual network interface of the workload of the one or more overlay nodes that corresponds to the virtual network interface identifier.

6. The controller of claim 5, wherein each virtual router is further configured to:
remove a second header of the network traffic that includes the virtual network sub-interface identifier prior to forwarding the network traffic to a virtual network sub-interface for the workload of the one or more overlay nodes that corresponds to the virtual network sub-interface identifier.

7. The controller of claim 6,
wherein the virtual network interface identifier comprises a first virtual network interface identifier, the virtual network interface for the workload comprises a first virtual network interface for a first workload, the virtual network sub-interface identifier comprises a first virtual network sub-interface identifier, and the virtual network sub-interface comprises a first virtual network sub-interface for the first workload, and
wherein each virtual router is further configured to:
receive network traffic associated with the first workload; and
forward, based on a second virtual network interface identifier for a second virtual network interface for a second workload of the one or more overlay nodes and a second virtual network sub-interface identifier of a second virtual network sub interface of the second workload, the network traffic to a virtual router for the second virtual network.

8. The controller of claim 7, wherein each virtual router is further configured to attach a first header to the network traffic that includes the second virtual network interface identifier prior to forwarding the network traffic to the second virtual router.

9. The controller of claim 8, wherein each virtual router is further configured to attach a second header to the network traffic that includes the second virtual network sub-interface identifier prior to forwarding the network traffic to the second virtual router.

10. The controller of claim 1, wherein the network controller is further configured to invoke a network plugin of the one or more overlay nodes to configure the virtual network sub-interfaces for the workloads of the one or more overlay nodes.

11. The controller of claim 1,
wherein the master overlay node comprises an overlay orchestrator, wherein the network controller is configured to receive, from the overlay orchestrator, one or more events, wherein the one or more events comprise at least one of a Create, Read, Update, or Delete (CRUD) request, a networking request, or a policy request.

12. The controller of claim 1, wherein the underlay cluster executes on one or more bare-metal servers, each of the one or more bare-metal servers comprising processing circuitry and a storage device.

13. A method comprising:
provisioning, by an underlay orchestrator of a controller for a virtualized computing infrastructure, an overlay cluster of one or more overlay nodes in an underlay cluster of one or more servers,
wherein each of the one or more overlay nodes is a workload of one of the one or more servers and has a virtual network interface,
wherein the underlay orchestrator is configured for execution by the processing circuitry, and
wherein each server of the one or more servers executes a virtual router and a virtual router agent for the virtual router for routing packets among virtual network interfaces of the overlay nodes executed by the server;
receive, by a network controller of the controller and from a network controller manager of a master overlay node that orchestrates workloads of the one or more overlay nodes, a request to create virtual network sub-interfaces for workloads of the one or more overlay nodes; and
configuring, by the network controller and in response to receiving the request from the network controller manager, virtual network sub-interfaces for the workloads of the one or more overlay nodes to enable communications among workloads executing in different overlay nodes, wherein each of the virtual network sub-interfaces is a sub-interface of one of the virtual network interfaces.

14. The method of claim 13, wherein configuring the virtual network sub-interfaces comprises configuring, by the network controller, the virtual network interfaces with unique virtual network sub-interface identifiers for the virtual network sub-interfaces.

15. The method of claim 14, wherein each of the unique sub-interface identifiers for the virtual network sub-interfaces comprises a unique Media Access Control (MAC)-based Virtual Local Area Network (VLAN) identifier for a VLAN of the one or more overlay nodes.

16. The method of claim 13, further comprising configuring, by the network controller, each virtual router to:
receive network traffic associated with the workloads, wherein the network traffic includes a virtual network interface identifier and a virtual network sub-interface identifier; and
forward, based on the virtual network interface identifier and the virtual network sub-interface identifier, the network traffic to a workload of the one or more overlay nodes.

17. The method of claim 13,
wherein the workload of the one or more overlay nodes comprises a first workload, the virtual network interface identifier comprises a first virtual network interface identifier that specifies a first virtual network interface for the first workload, and the virtual network sub-interface identifier comprises a first virtual network sub-interface identifier that specifies a first virtual network sub-interface for the first workload, and
wherein the method further comprises configuring, by the network controller, each virtual router to:
receive network traffic associated with the first workload; and
forward, based on a second virtual network interface identifier for a second virtual network interface for a second workload of the one or more overlay nodes and a second virtual network sub-interface identifier of a second virtual network sub-interface of the second workload, the network traffic to a second virtual router for the second virtual network.

18. The method of claim 13, wherein the underlay cluster executes on one or more bare-metal servers, each of the one or more bare-metal servers comprising processing circuitry and a storage device.

19. A system comprising:
a first computing device comprising processing circuitry coupled to a memory device,
wherein the first computing device executes one or more overlay minion nodes of an overlay cluster,
wherein each of the one or more overlay minion nodes has a virtual network interface and executes workloads,
wherein the first computing device further executes a virtual router and a virtual router agent for the virtual router for routing packets among virtual network interfaces of the one or more overlay minion nodes of the overlay cluster; and
a second computing device comprising processing circuitry coupled to a memory device,
wherein the second computing device is configured to execute an overlay orchestrator configured to orchestrate the workloads executed by the one or more overlay minion nodes of the overlay cluster,
wherein the second computing device is further configured to execute a network controller manager configured to cause a network controller to configure virtual network sub-interfaces for the workloads executed by the one or more overlay minion nodes of the overlay cluster, and
wherein the virtual router agent is configured to receive, from the network controller, network configuration data for the virtual network sub-interfaces for the workloads,
wherein the first computing device is further configured to execute a network module configured to:
obtain the network configuration data from the virtual router agent; and
based on the network configuration data, configure virtual network sub-interfaces for the workloads of the one or more overlay nodes to enable communications among workloads executing in different overlay nodes, wherein each of the virtual network sub-interfaces is a sub-interface of one of the virtual network interfaces.

20. The system of claim 19, wherein the network module is further configured to, based on the network configuration data, configure the virtual network interfaces of the one or more overlay minion nodes.

* * * * *